United States Patent
Kato et al.

(10) Patent No.: US 7,845,450 B2
(45) Date of Patent: Dec. 7, 2010

(54) REAR FRAME ATTACHMENT STRUCTURE FOR TWO-WHEELED MOTOR VEHICLE

(75) Inventors: Yuichi Kato, Wako (JP); Yuji Noguchi, Wako (JP); Daisuke Soeno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 173 days.

(21) Appl. No.: 12/360,438

(22) Filed: Jan. 27, 2009

(65) Prior Publication Data
US 2009/0194353 A1  Aug. 6, 2009

(30) Foreign Application Priority Data
Jan. 31, 2008 (JP) ............................. 2008-021465

(51) Int. Cl.
B62D 61/02 (2006.01)
B62K 11/02 (2006.01)
B62M 7/00 (2010.01)

(52) U.S. Cl. ..................... 180/219; 180/311; 180/312

(58) Field of Classification Search ................ 180/219, 180/311, 312; 280/63; 411/372.5, 910
See application file for complete search history.

(56) References Cited

U.S. PATENT DOCUMENTS

| | | | | |
|---|---|---|---|---|
| 4,461,366 A * | 7/1984 | Honda | | 180/229 |
| 4,485,884 A * | 12/1984 | Fukunaga et al. | | 180/219 |
| 4,706,774 A * | 11/1987 | Tsuboi | | 180/227 |
| 4,723,621 A * | 2/1988 | Kawano et al. | | 180/219 |
| 4,776,422 A * | 10/1988 | Sakuma | | 180/219 |
| 4,781,264 A * | 11/1988 | Matsuzaki et al. | | 180/219 |
| 4,805,716 A * | 2/1989 | Tsunoda et al. | | 180/219 |
| 4,852,678 A * | 8/1989 | Yamaguchi | | 180/219 |
| 4,989,665 A * | 2/1991 | Yamagiwa et al. | | 164/363 |
| 5,248,012 A * | 9/1993 | Kurawaki et al. | | 180/219 |
| 6,073,719 A * | 6/2000 | Ohmika et al. | | 180/219 |
| 6,290,015 B1 * | 9/2001 | Horii et al. | | 180/219 |
| 6,371,236 B1 * | 4/2002 | Fukunaga | | 180/219 |
| 6,412,856 B1 * | 7/2002 | Kajikawa et al. | | 296/203.01 |
| 6,478,105 B2 * | 11/2002 | Okuma | | 180/219 |
| 6,640,921 B2 * | 11/2003 | Okuma | | 180/219 |
| 6,688,274 B2 * | 2/2004 | Yokoyama et al. | | 123/198 E |

(Continued)

FOREIGN PATENT DOCUMENTS

JP  02095997 A  *  4/1990

(Continued)

*Primary Examiner*—Toan C To
*Assistant Examiner*—Laura Freedman
(74) *Attorney, Agent, or Firm*—Westerman, Hattori, Daniels & Adrian, LLP (57) ABSTRACT

A rear frame attachment structure for a two-wheeled motor vehicle includes a main frame supporting an engine, a pair of right and left center frames extending vertically behind the engine, and a rear frame supporting a seat and a side cover. An end section of the rear frame is attached to the center frame by a fastening member. A concave section of the center frame is formed in an outside surface of the center frame and is attached to the end section of the rear frame. Further, an end section of the side cover extends to a periphery of a head section of the fastening member. The concave section and the end section of the side cover surround the periphery of the head section of the fastening member.

4 Claims, 9 Drawing Sheets

U.S. PATENT DOCUMENTS

| | | | |
|---|---|---|---|
| 7,419,028 B2 * | 9/2008 | Yamakura et al. | 180/291 |
| 7,624,835 B2 * | 12/2009 | Bowers | 180/346 |
| 7,644,796 B2 * | 1/2010 | Taniguchi | 180/219 |
| 2009/0242300 A1 * | 10/2009 | Mizukura et al. | 180/69.4 |
| 2009/0242551 A1 * | 10/2009 | Matayoshi et al. | 220/4.13 |
| 2009/0321172 A1 * | 12/2009 | Tokisato | 180/335 |
| 2010/0012415 A1 * | 1/2010 | Hedtke | 180/219 |

FOREIGN PATENT DOCUMENTS

| | | | |
|---|---|---|---|
| JP | 04078681 A | * | 3/1992 |
| JP | 05262269 A | * | 10/1993 |
| JP | 06191459 A | * | 7/1994 |
| JP | 2001-278152 A | | 10/2001 |
| JP | 2003-72648 A | | 3/2003 |

* cited by examiner

REAR FRAME ATTACHMENT STRUCTURE FOR TWO-WHEELED MOTOR VEHICLE

TECHNICAL FIELD

The present invention relates to a rear frame attachment structure for a two-wheeled motor vehicle for attaching a rear frame to a center frame.

BACKGROUND OF THE INVENTION

It is known to attach a rear frame (which extends rearward of a vehicle body) of a two-wheeled motor vehicle, at one end section thereof, to a periphery of a pivot shaft of a center frame by a bolt. A seat, a side cover, and the like are attached to the rear frame. In one known structure (e.g., Japanese Patent Application Publication No. 2001-278152), a concave section is provided in the center frame and one end section of the rear frame is attached to the concave section.

In the structure explained above, a rider's foot is placed near the described bolt. However, when the bolt bulges more than another member (e.g., the frame), the bolt acts as an obstacle. Although the bolt may be covered with a covering or the like, this results in an increase in the cover size (e.g., adversely affecting the operation of the operator's riding position and foot operation) and an increase in the number of parts (e.g., increasing manufacturing and assembly costs).

The present invention has been made in view of the circumstance described above, and provides a rear frame attachment structure for a two-wheeled motor vehicle which eliminates the necessity of a space provided around a bolt for attaching a rear frame.

SUMMARY OF THE INVENTION

In order to solve the problem described above, the present invention provides a rear frame attachment structure for a two-wheeled motor vehicle comprising a main frame supporting components of a vehicle body such as an engine, a pair of right and left center frames extending vertically behind the engine, and a rear frame supporting a seat and a side cover, an end section of the rear frame being attached to the center frame by a tightening member (fastening member). In this rear frame attachment structure, for example, a concave section depressed inward of the vehicle body and having the end section of the rear frame attached thereto is formed in an outside surface of the center frame, and an end section of the side cover extends up to a periphery of a head section of the tightening member, so that the concave section and the end section of the side cover surround the periphery of the head section of the tightening member.

Accordingly, the bulge can be eliminated without providing another cover or causing the size of the cover to increase. Thus, the head section of the tightening member does not affect the foot operation of the driver, and the driver can assume a better riding position.

The end section of the rear frame may be formed with a wall section which bulges outward of the vehicle body more than the head section of the tightening member and which surrounds the periphery of the head section of the tightening member together with the concave section and the end section of the side cover.

Accordingly, the periphery of the head section of the tightening member is easily surrounded and the bulge of the tightening member can be eliminated.

The tightening member may be configured to be detachably attachable to the vehicle body in a state where the side cover is attached.

Accordingly, the rear frame is detachable without the removal of a part such as the side cover from the vehicle body, although the periphery of the head section of the tightening member is surrounded. Therefore, the maintenance properties are improved.

BRIEF DESCRIPTION OF THE DRAWINGS

A preferred embodiment of the present invention will be described with reference to the accompanying drawings, wherein.

DETAILED DESCRIPTION OF THE INVENTION

Figure 1:
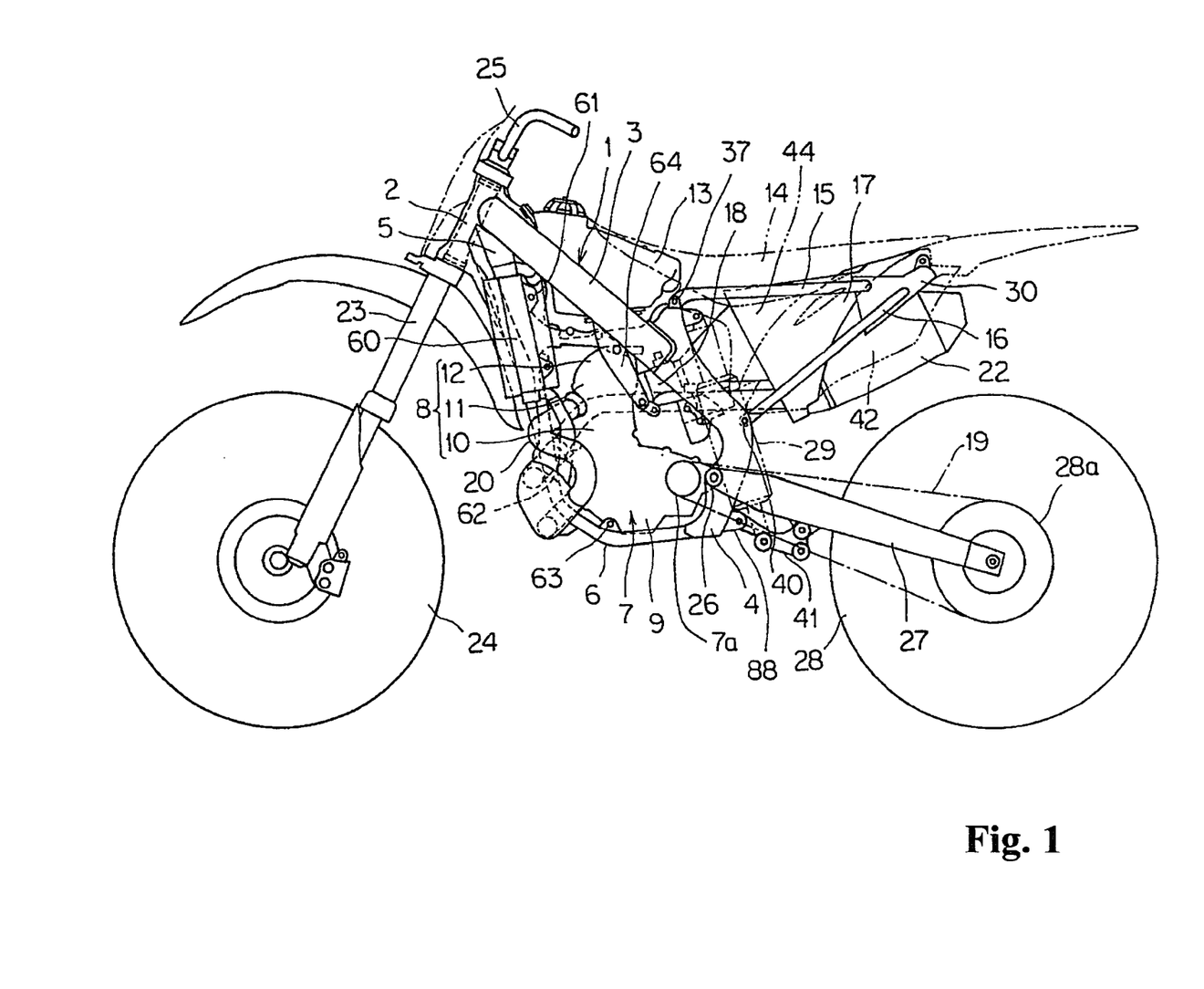
FIG. 1 is a side view of a two-wheeled motor vehicle in an embodiment of the present invention.

Hereinafter, one embodiment will be described based on the drawings. FIG. 1 is a side view of an off-road two-wheeled motor vehicle including a rear frame attachment structure according to the embodiment of the present invention.

A vehicle body frame 1 of the two-wheeled motor vehicle includes a head pipe 2, a main frame 3, a center frame 4, a down frame 5, and a lower frame 6, which are connected in loop form to support an engine 7 in the inside thereof. The engine 7 includes a cylinder 8 and a crank case 9. The main frame 3, the center frame 4, and the lower frame 6 are provided respectively in right and left as pairs, and the head pipe 2 and the down frame 5 are provided singularly along the center of the vehicle body.

The main frame 3 extends above the engine 7 obliquely downward and rearward in straight line, and is connected to an upper end section of the center frame 4 extending in the vertical direction behind the engine 7. The down frame 5 extends obliquely downward and rearward in front of the engine 7, and a lower end section of the down frame 5 is connected to a front end section of the lower frame 6. At a front side lower section of the engine 7, the lower frame 6 bends to extend rearward below the engine 7 approximately linearly. A rear end section of the lower frame 6 is connected to a lower end section of the center frame 4.

The engine 7 employs a water-cooled four-stroke system. The cylinder 8 is provided to a front section of the crank case 9 in an upright state in which the cylinder axis thereof is approximately vertical, and includes a cylinder block 10, a cylinder head 11, and a head cover 12 in this order from bottom to top. When the cylinder 8 is upright, the engine 7 is shortened in the front-back direction to make the configuration of the engine 7 suitable for an off-road vehicle.

Above the engine 7, a fuel tank 13 is arranged and supported on the main frame 3. Inside the fuel tank 13, a built-in fuel pump (not shown) is stored, and high-pressure fuel is supplied from the fuel pump to a throttle body 18 via a fuel supply pipe.

A seat 14 is arranged behind the fuel tank 13 to be supported on the seat rail 15 extending rearward from the upper end of the center frame 4. Below the seat rail 15, a rear frame 16 is arranged. The seat rail 15 and the rear frame 16 support an air cleaner 17, whereby air is taken in from the rear side of the vehicle body to the cylinder head 11 via the throttle body 18.

In the front section of the cylinder 8, an exhaust pipe 20 is provided. The exhaust pipe 20 extends from the front section of the cylinder 8 to the front of the crank case 9, bends toward the right, and is then drawn around to be directed rearward on the right side of the vehicle body. A muffler 22 extends rearward from the exhaust pipe 20. A rear end section of the muffler 22 is supported by the rear frame 16.

The head pipe 2 supports a front fork 23, and a front wheel 24 supported by a lower end section thereof is steered by a handle 25. The center frame 4 swingably supports a front end section of a rear arm 27 by a pivot shaft 26. A rear end section of the rear arm 27 supports a rear wheel 28, which is driven by a drive chain 19 wound around a drive sprocket 7a of the engine 7 and a driven sprocket 28a of the rear wheel 28. Between the rear arm 27 and a rear end section of the center frame 4, a cushion unit 29 of a rear suspension is provided.

On the rear side of the center frame 4 and the lower side of the lower right and left sides of the seat 14, a first side cover 42 and a second side cover 44 covering a side section of the vehicle body are provided. The first side cover 42 and the second side cover 44 cover the air cleaner 17, the seat rail 15, the rear frame 16, and the like. Note that the details of the first side cover 42 and the second side cover 44 will be described later.

Note that, in FIG. 1, reference numeral 60 denotes a radiator, 61 denotes a rubber mount section, 62 and 63 denote engine mount sections, and 64 denotes an engine hanger.

Figure 2:
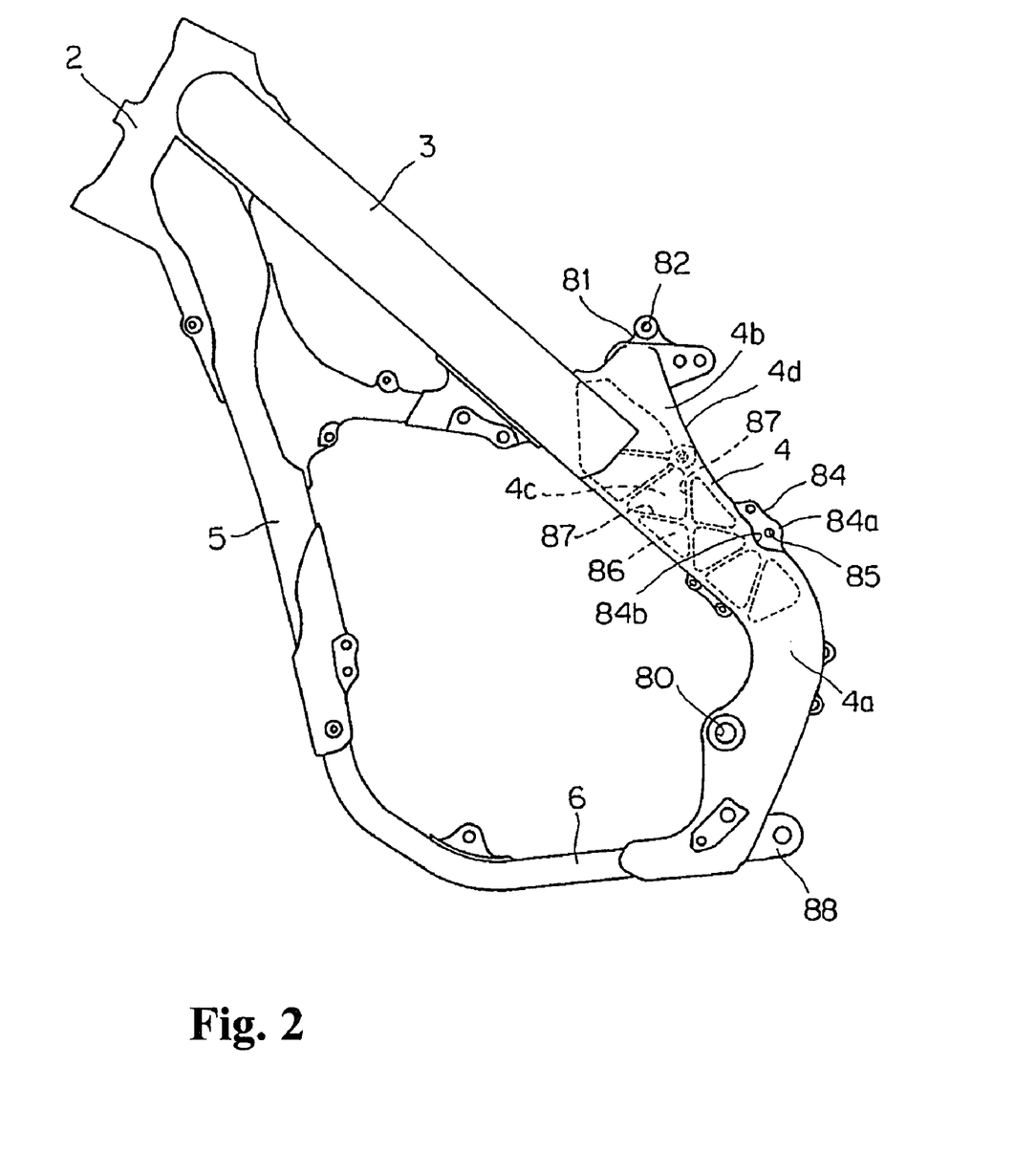
FIG. 2 is a side view of a vehicle body frame.

FIG. 2 is a side view of the vehicle body frame 1. Note that the center frame 4 is horizontally symmetrical, and has common shapes on the right and left portion unless stated in particular.

In the body frame 1, as described above, the main frame 3, the center frame 4, the down frame 5, and the lower frame 6 are connected in loop form in an approximate triangle shape, and the engine 7 is supported inside this triangle.

Of these, as shown in FIG. 2, the right and left pair of the center frames 4 on the rear side of the vehicle body extend vertically, and include bend sections 4a bent in V-shapes having vertical center sections thereof directed rearward of the vehicle body.

On a slightly lower side of the bend section 4a, a pivot hole 80 to which the pivot shaft 26 is attached is formed.

On a slightly upper portion of the bend section 4a and the upper surface side of the center frame 4, a concave section 84 to which one end section of the rear frame 16 is attached is provided. The concave section 84 is configured of an attachment surface 84a in which an outside surface 4b of the center frame 4 is depressed inward of the vehicle body, and a cutout wall section 84b in which an upper surface 4d of the center frame 4 is cut out in an arc shape (almost half circle shape) directed obliquely frontward and downward. The attachment surface 84a is provided with an attachment hole 85 penetrating in the vehicle body width direction.

On the lower end section of the center frame 4, a tension bracket 88 is provided. The cushion unit 29 is attached to the tension bracket 88 through a link mechanism 41 (see FIG. 1).

On the upper end section of the center frame 4, in a connection section with a rear end section of the main frame 3, a seat rail supporting section 81 is formed. The seat rail supporting section 81 protruding upward from the upper surface of the center frames 4 are provided to the right and left center frames 4, respectively. An attachment hole 82 is formed in each seat rail supporting section 81.

An inside surface 4c of the center frame 4 is depressed toward the outside of the vehicle body to form plural concave sections 86 for reducing weight of the center frame 4. Between the adjacent concave sections 86, plural ribs 87 for securing bending rigidity of the center frame 4 are provided in a truss form.

Figure 3:
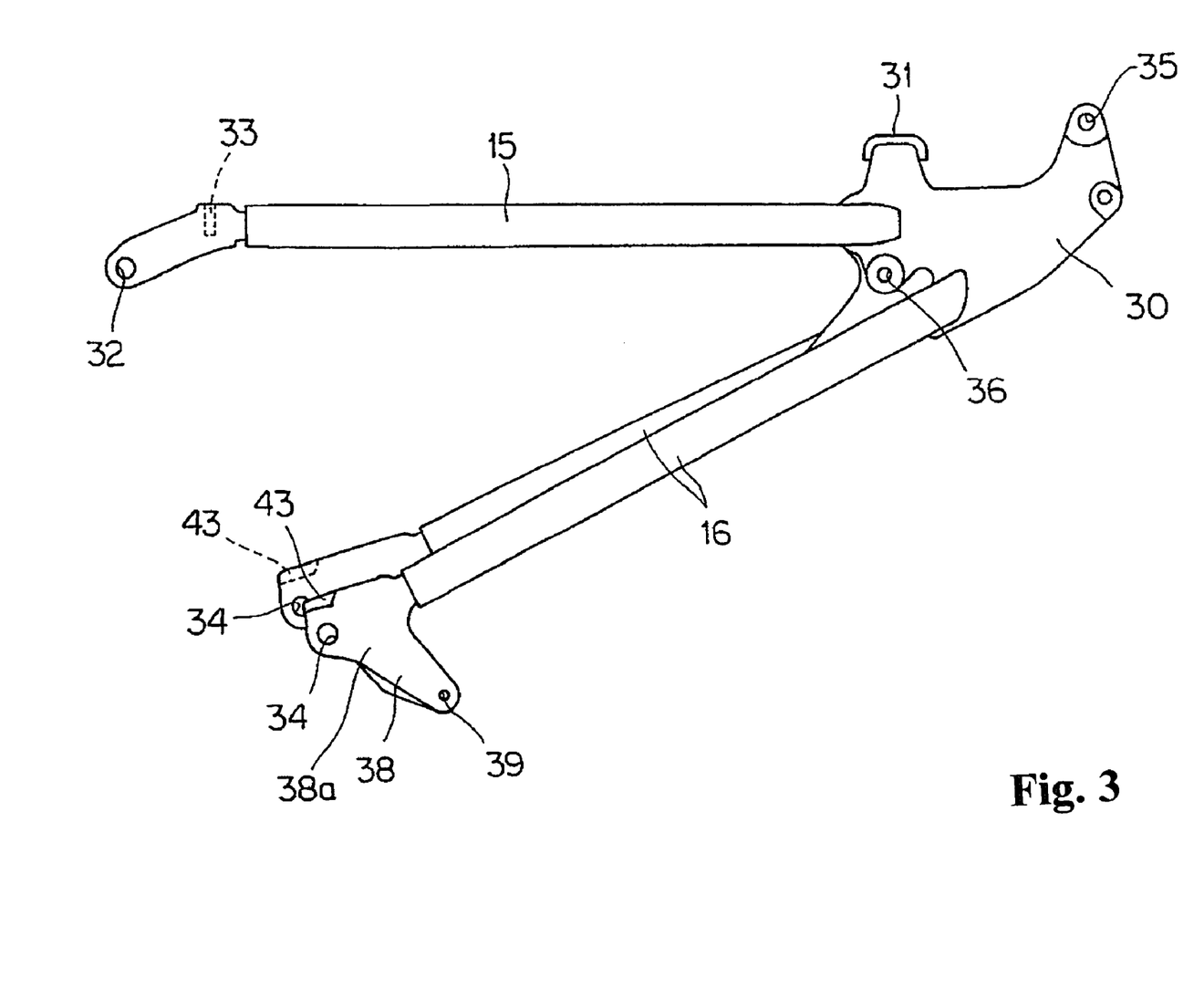
FIG. 3 is a front view of a seat rail and a reinforcement frame being attached integrally.
Figure 4:
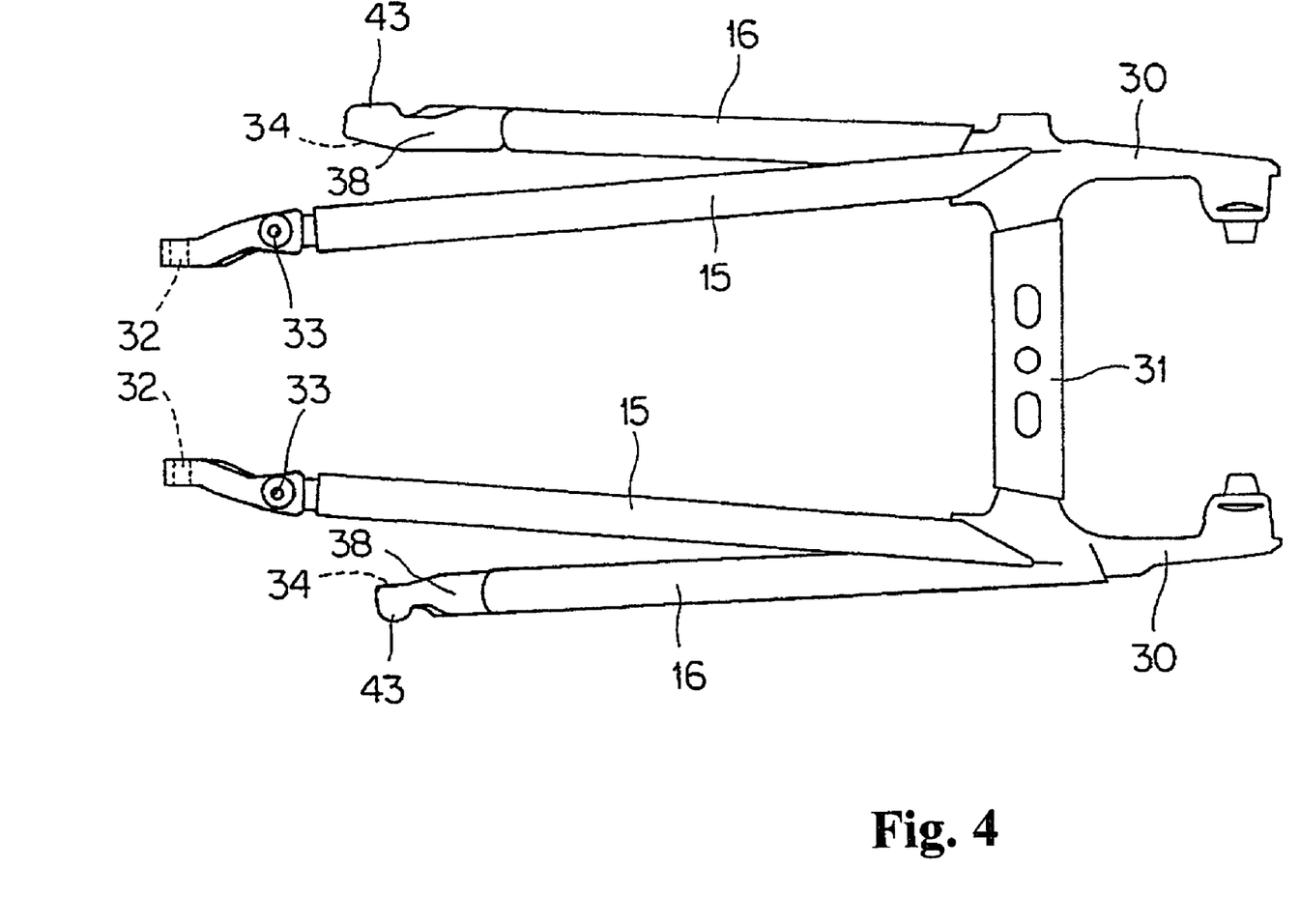
FIG. 4 is a plan view of FIG. 3.

FIG. 3 is front view of the seat rail 15 and the rear frame 16 shown in FIG. 1, and FIG. 4 is a plan view thereof.

The seat rail 15 and the rear frame 16 are each configured in right and left pairs, and the rear sides of the seat rail 15 and the rear frame 16 are integrally attached to a gusset 30.

As shown in FIG. 3, the right and left seat rails 15 extend approximately leveled in the front-back direction, and each of front end sections (left end sections in FIG. 3) thereof are provided with two attachment holes 32 and 33. The attachment holes 32 located in the left end sections are for attaching the seat rails 15 to the attachment holes 82 of the center frame 4 by bolts 37 (see FIG. 1), and are formed respectively to penetrate in the vehicle width direction. The attachment holes 33 are for attaching a bracket (not shown) for installing ECU (fuel control unit) to the seat rails 15, and are respectively drilled in the vertical direction.

As shown in FIG. 3, the right and left rear frames 16 extend obliquely downward and frontward from the gussets 30 on the rear side of the frames 16, and stays 38 are attached to the front end sections of the frames 16 by welding. The stay 38 has an attachment surface 38a approximately parallel to a side surface of the vehicle body, and a left side tip end section of the attachment surface 38a is provided with an attachment hole 34 for fixation to the attachment hole 85 of the concave section 84 of the center frame 4 by a bolt 40 (see FIG. 1). On the upper side of the attachment hole 34, a wall section 43 is provided to protrude (bulge) toward the outside of the vehicle body from the attachment surface 38a.

In a lower right section of the attachment hole 34, an attachment hole 39 for attaching a side cover 42 is provided.

Note that the right and left rear frames 16 have slightly different inclination angles, as shown in FIG. 3. Also, the right and left stays 38 have different shapes in relation to the exhaust pipe 20, and the stay 38 on the right side is made slightly larger in order to provide a fixing section for the muffler 22. Therefore, although the positions of the attachment holes 39 described above are the same on the right and left rear frame 16, the positions of the attachment holes 34 and the wall sections 43 slightly differ on the right and left.

As shown in FIG. 3, the right and left gussets 30 are formed with seat attachment holes 35, muffler attachment holes 36, and the like penetrating in the vehicle width direction. As shown in FIG. 4, the right and left gussets 30 are connected firmly to a cross plate 31 extending in the vehicle body width direction to secure rigidity that enables the seat 14 and the muffler 22 to be supported.

The seat rail 15 is attached to the attachment hole 82 of the center frame 4 by the bolt 37 (see FIG. 1) inserted and tightened to the attachment hole 32, and the rear frame 16 is attached similarly by the bolt 40 (see FIG. 1) tightened to the attachment hole 34. That is, the seat rail 15 and the rear frame 16 can be removed from the center frame 4 by removing the bolts 37 and 40. The first side cover 42 and the second side cover 44 can also be removed together while being attached to the seat rail 15 and the rear frame 16.

Figure 5:
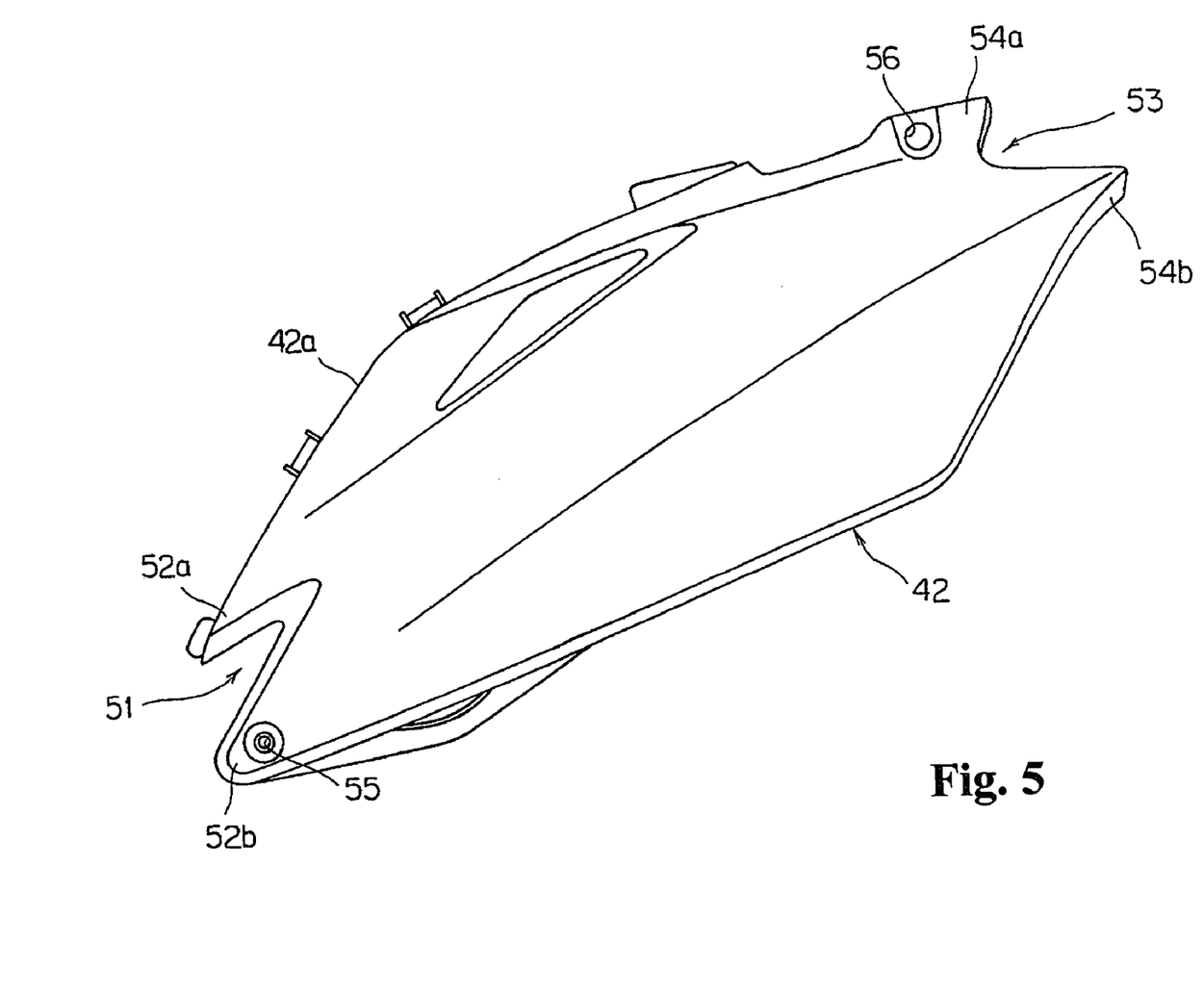
FIG. 5 is a front view of a first side cover.

FIG. 5 is a front view of the first side cover 42.

Figure 8:
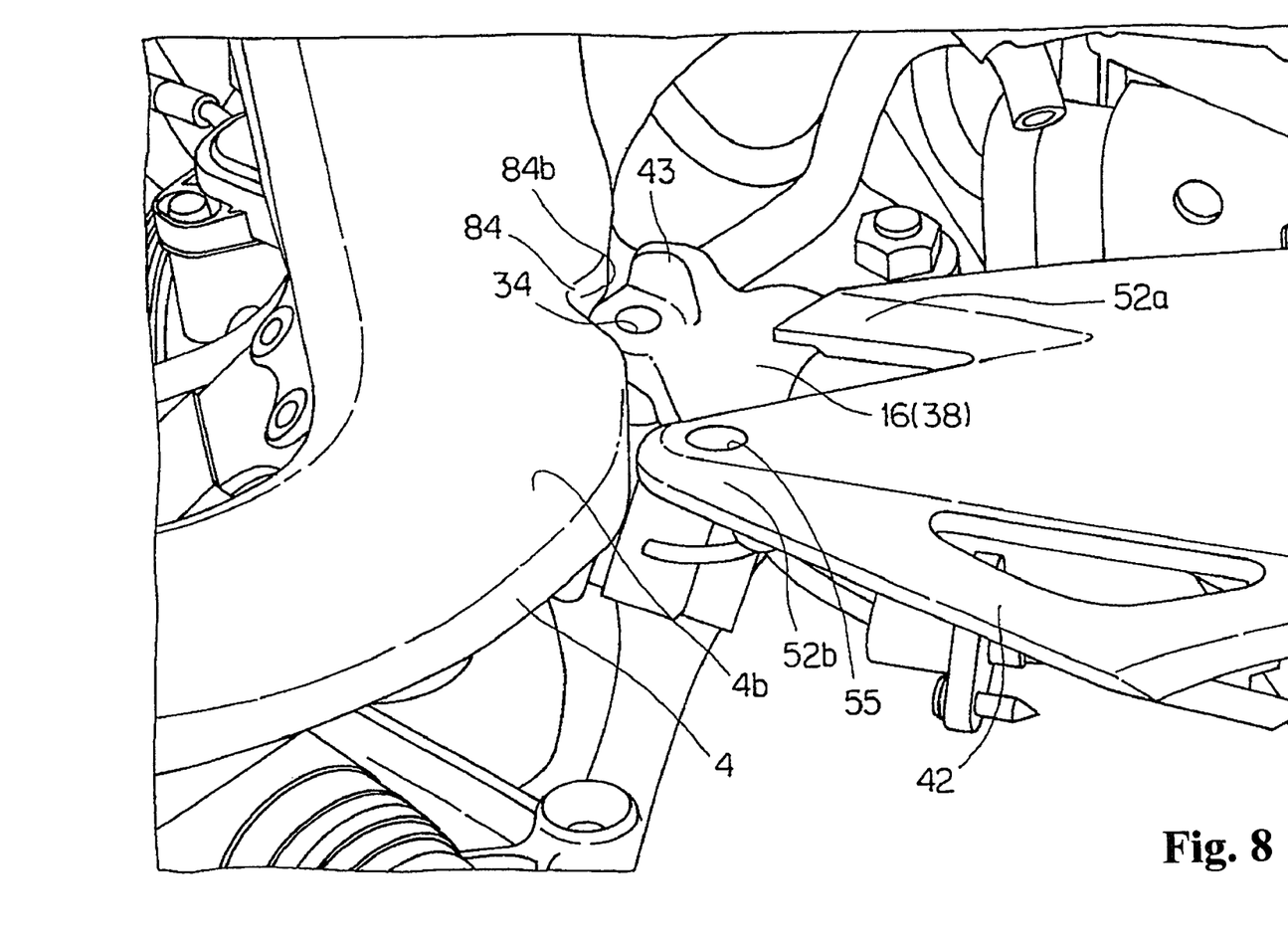
FIG. 8 is a perspective view showing a state where the second side cover and a bolt are removed from a state of FIG. 7.

As shown in FIGS. 1 and 5, the first side cover 42 has an approximate rhombus shape obliquely extending from the front side of the vehicle body (left side in FIG. 8) to the upper-rear side of the vehicle body (upper-right side in FIG. 8). A front section 51 of the first side cover 42 is constricted in an approximate V-shape directed rearward of the vehicle body, and is configured of an upper side extension section 52a and a lower side extension section 52b protruding forward. In the same manner, a rear section 53 is configured of an upper side extension section 54a and a lower side extension section 54b protruding rearward.

The lower side extension section 52b is formed with an attachment hole 55 for attaching the first side cover 42. The attachment hole 55 is attached to the attachment hole 39 formed in the stay 38 of the rear frame 16 by a tightening member (not shown).

Also, an attachment hole 56 for attaching the first side cover 42 is formed near the upper side extension section 54a. The attachment hole 56 is attached to an attachment hole formed in the gusset 30 located on the rear end of the rear frame 16 by a tightening member.

Figure 6:
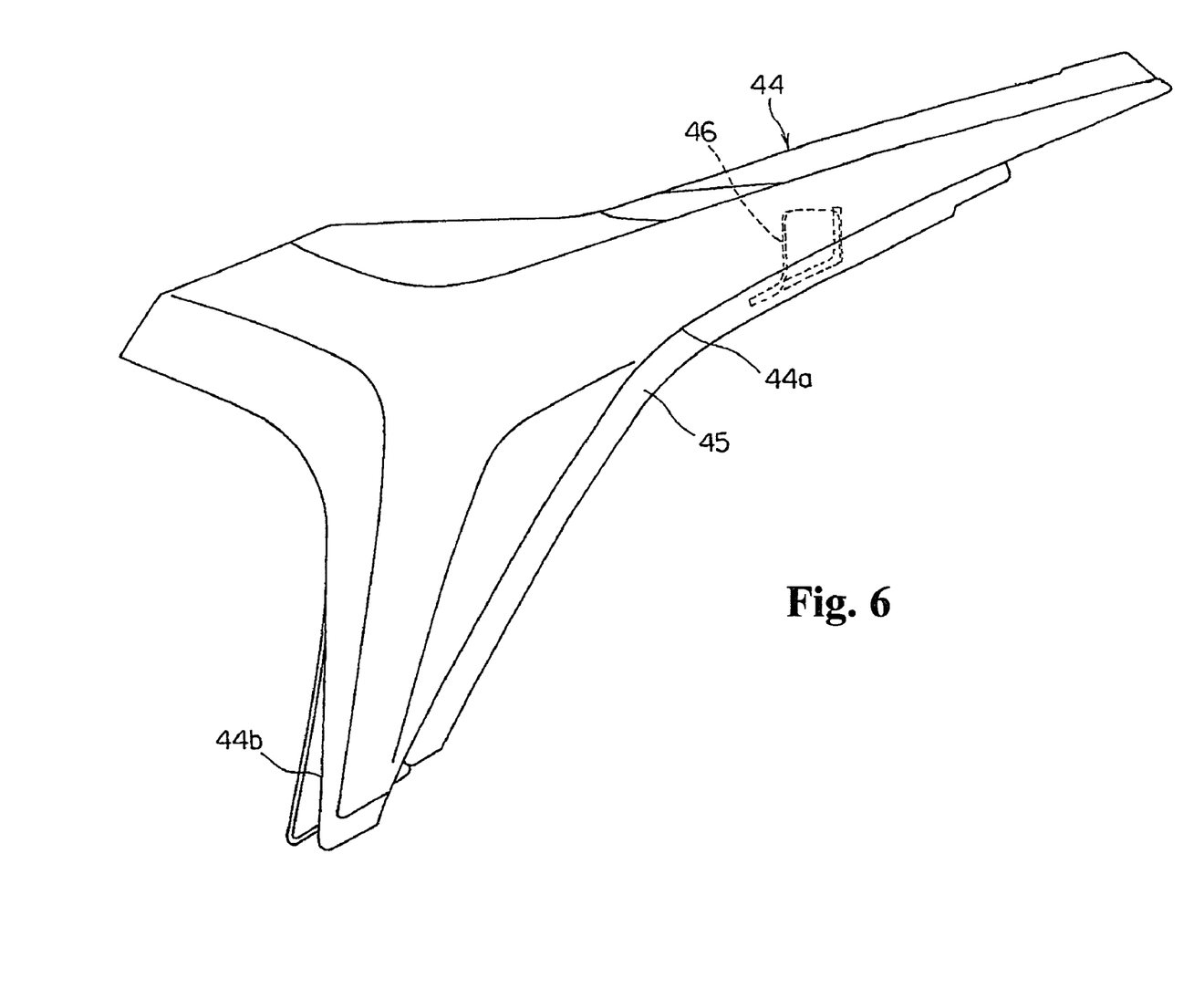
FIG. 6 is a front view of a second side cover.

FIG. 6 is a front view of the second side cover 44.

As shown in FIGS. 1 and 6, the second side cover 44 is formed in an approximate T-shape. The shape of a lower right edge section 44a of the second side cover 44 coincides with the shape of an upper side edge section 42a (see FIG. 5) of the first side cover 42. The lower right edge section 44a and the upper side edge section 42a are assembled such that a flange section 45 extending along the shape of the lower right edge section 44a is engaged under the first side cover 42. On the back side of the second side cover 44, an attachment section 46 for attaching the second side cover 44 to the seat rail 15 is provided.

Figure 7:
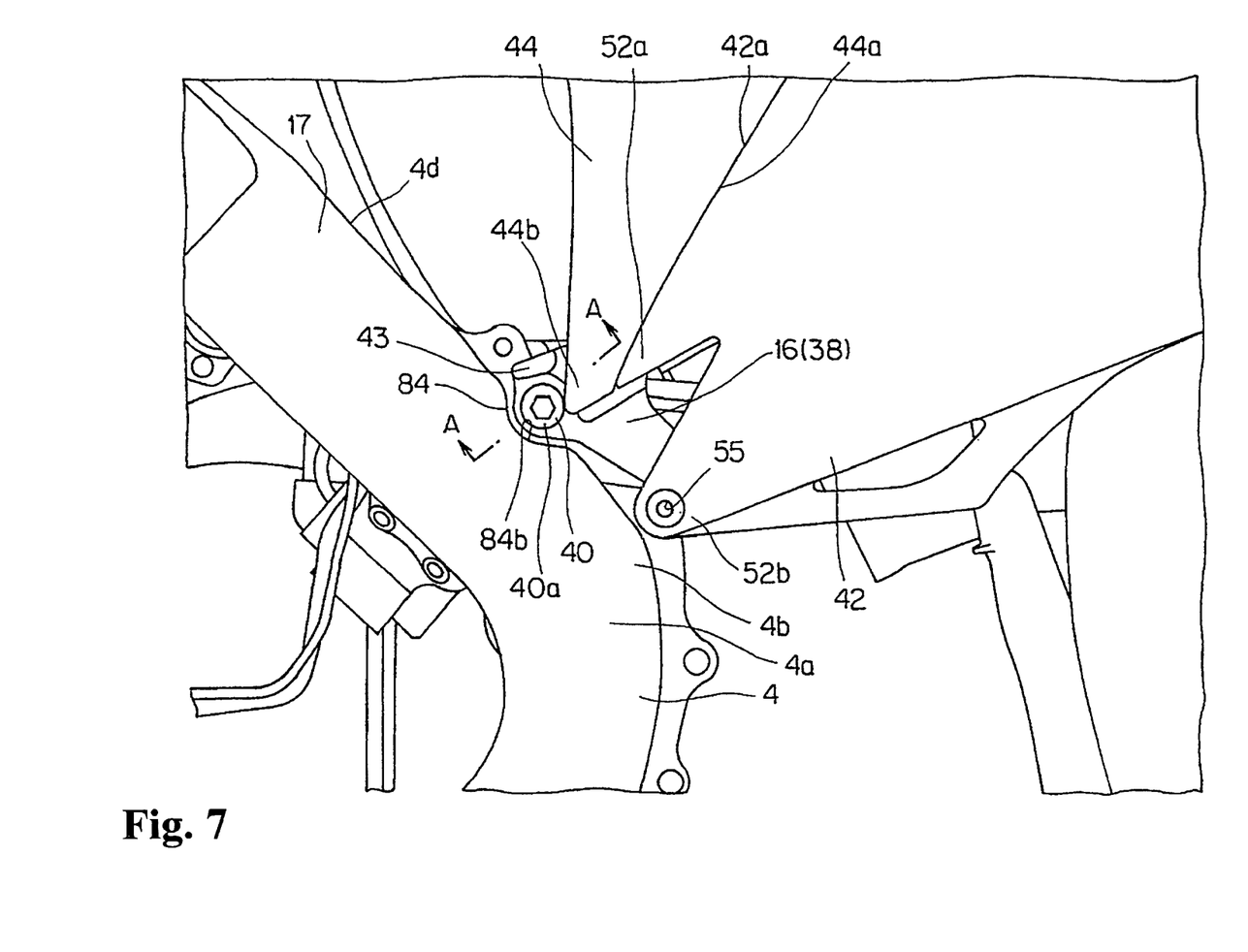
FIG. 7 is an enlarged side view showing an attachment section of a rear frame.

FIG. 7 is an enlarged side view showing an attachment portion of the rear frame 16 of FIG. 1. FIG. 8 is a perspective view of a state where the second side cover 44 and the bolt 40 are removed from the state of FIG. 7 when seen obliquely downward.

In a state where the first side cover 42 and the second side cover 44 are assembled to the seat rail 15 and the rear frame 16, a lower end section 44b of the second side cover 44 extends frontward of the vehicle body to extend from the upper side extension section 52a of the first side cover 42, as shown in FIG. 7.

As shown in FIGS. 5 and 7, the rear frame 16 is attached to the attachment hole 85 (see FIG. 2) of the center frame 4 by the bolt 40.

At the right side of a head section of the bolt 40, the lower end section 44b of the extending second side cover 44 is located, as shown in FIG. 7. Above the bolt 40, the wall section 43 formed in the stay 38 of the rear frame 16 is located, as shown in FIGS. 7 and 8. Further, the cutout wall section 84b of the concave section 84 of the center frame 4 is located below the bolt 40 and also at the left side of the bolt 40, as shown in FIGS. 7 and 8.

That is, the periphery of the head section of the bolt 40 is surrounded by the lower end section 44b of the second side cover 44, the wall section 43, and the cutout wall section 84b when seen from the lateral side of the vehicle body. In this manner where the periphery of the head section of the bolt 40 is surrounded, an extra space for an object to enter is eliminated in the periphery of the bolt 40. Therefore, an object is not hooked or sandwiched in the periphery of the bolt 40.

The lateral side of head section of the bolt 40 with respect to the vehicle body is not covered by the wall section 43, the cutout wall section 84b, and the lower end section 44b, and the bolt 40 can be detached from the lateral side of the vehicle body. As the bolt 40, a bolt which can be tightened by inserting a tool from the lateral side of the vehicle body, such as a hexagon socket head bolt, is used.

Figure 9:
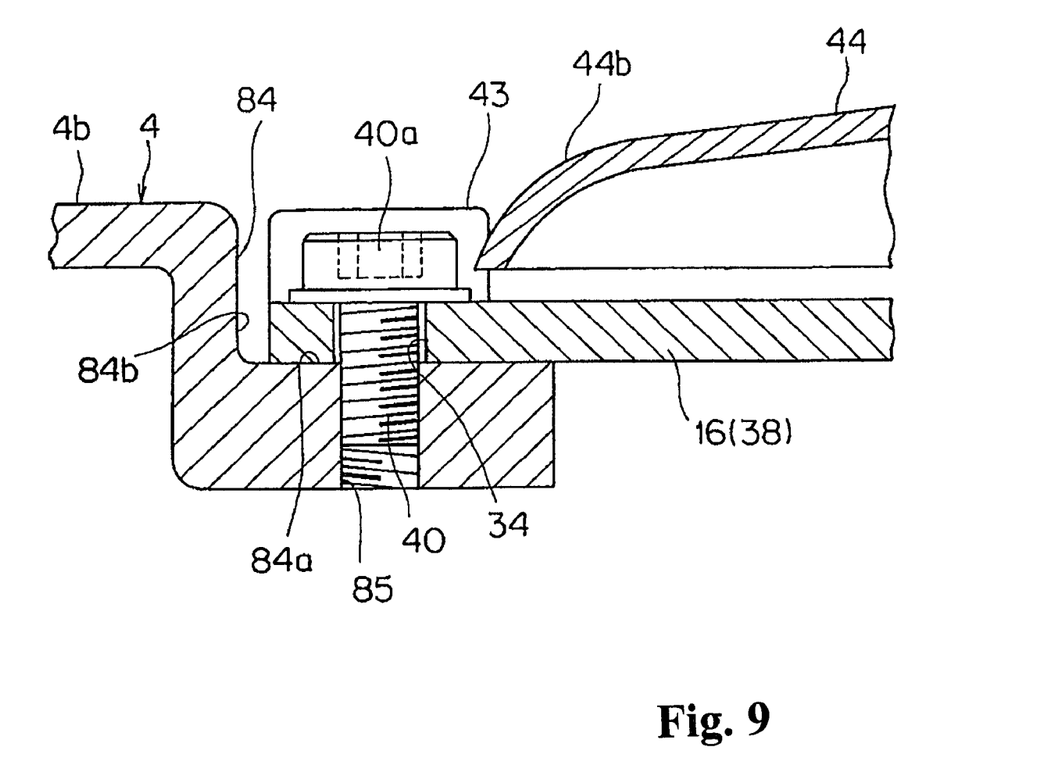
FIG. 9 is a sectional view along A-A of FIG. 7.

FIG. 9 is a sectional view showing a sectional surface of a tightening portion of the bolt 40 along A-A of FIG. 7.

When the bolt 40 is tightened, a head section 40a of the bolt 40 in the vehicle body width direction is located at a position closer to the center of the vehicle body (in the lower side direction in FIG. 9) than the outside surface 4b of the center frame 4, a tip end section of the wall section 43 in the outside direction of the vehicle body, and the second side cover 44 are located. That is, the head section 40a of the bolt 40 is prevented from protruding outward from the vehicle body, so that an object is hardly hooked to the bolt 40.

In the rear frame attachment structure for a two-wheeled motor vehicle according to the embodiment of the present invention, the concave section 84 is formed in the center frame 4 to be directed inward of the vehicle body, and the wall section 43 bulging outward of the vehicle body is formed in the end section of the rear frame 16 attached to the concave section 84. Moreover, the lower end section 44b of the second side cover 44 extends up to the periphery of the head section 40a of the bolt 40. Thus, the periphery of the head section 40a of the bolt 40 is surrounded by the cutout wall section 84b of the concave section 84, the wall section 43, and the lower end section 44b of the second side cover 44, and a space for an object to enter is not formed in the periphery of the head section 40a of the bolt 40. Accordingly, an object hardly enters in the periphery of the head section 40a of the bolt 40.

The head section 40a of the bolt 40 in the vehicle body width direction is located at a position closer to the center of the vehicle body than the outside surface 4b of the center frame 4, a tip end section of the wall section 43 in the outside direction of the vehicle body, and the second side cover 44 are located. Thus, an object is hardly hooked to the head section 40a of the bolt 40. Since the head section 40a of the bolt 40 does not affect the foot operation of the rider, the rider can take a good riding position.

Further, even when the first and second side covers 42 and 44 are attached, the bolt 40 is detachable from the lateral side of the vehicle body because the vehicle body lateral side of the head section 40a of the bolt 40 is not covered with the wall section 43, the cutout wall section 84b and the lower end section 44b. Thus, the bolt 40 is freely detachable regardless of the first and second side covers 42 and 44, and the rear frame is detachably attachable without the removal of parts such as the side cover. Therefore, the maintenance properties are improved.

The embodiment of the present invention has been described above. However, various modifications and changes are possible based on the technical idea of the present invention.

For example, in this embodiment, the periphery of the head section 40a of the bolt 40 is surrounded by the cutout wall section 84b of the concave section 84, the wall section 43, and the lower end section 44b of the second side cover 44, but it may be surrounded only by the cutout wall section 84b of the concave section 84 and the tower end section 44b of the second side cover 44. Here, the concave section 84 and the second side cover 44 (and/or the first side cover 42) can be provided to surround the periphery of the head section 40a of the bolt 40 and to eliminate a space for an object to enter.

Obviously, the same effect can be obtained by surrounding the head section 40a of the bolt 40 by the cutout wall section 84b of the concave section 84 and the wall section 43.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A frame structure for a two-wheeled motor vehicle, comprising:
    a main frame supporting an engine;
    a center frame including a pair of right and left center frames extending vertically behind the engine; and
    a rear frame supporting a seat and a side cover; wherein
    an end section of the rear frame is attached to the center frame by a fastening member,
    a concave section of the center frame is formed in an outside surface of the center frame and is attached to the end section of the rear frame,
    an end section of the side cover extends to a periphery of a head section of the fastening member, and
    the concave section and the end section of the side cover surround the periphery of the head section of the fastening member.

2. The rear frame attachment structure of claim 1, further comprising:
    a wall section formed in the end section of the rear frame, wherein
    the wall section bulges further outward of the vehicle body than the head section of the fastening member, and
    the periphery of the head section of the fastening member is surrounded by the wall section, the concave section and the end section of the side cover.

3. The rear frame attachment structure of claim 2, wherein the fastening member is detachably attached to said vehicle in a state where the side cover is attached to the rear frame of said vehicle.

4. The rear frame attachment structure of claim 1, wherein the fastening member is detachably attached to said vehicle in a state where the side cover is attached to the rear frame of said vehicle.

* * * * *